(12) United States Patent
Wind

(10) Patent No.: US 7,187,685 B2
(45) Date of Patent: Mar. 6, 2007

(54) MULTI-MODULE SWITCHING SYSTEM

(75) Inventor: Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 1128 days.

(21) Appl. No.: 10/215,812

(22) Filed: Aug. 8, 2002

(65) Prior Publication Data
US 2003/0035428 A1 Feb. 20, 2003

(30) Foreign Application Priority Data
Aug. 9, 2001 (EP) .................................. 01480073

(51) Int. Cl.
*G06F 15/16* (2006.01)
*H04J 3/06* (2006.01)
(52) U.S. Cl. ...................... 370/412; 370/517; 370/519; 370/395.72; 709/208; 709/209; 709/211
(58) Field of Classification Search ................ 370/412, 370/410, 413, 419, 389, 517, 471, 503, 518, 370/519, 395.71, 474; 709/213, 214, 209, 709/222, 208, 211
See application file for complete search history.

(56) References Cited
U.S. PATENT DOCUMENTS
5,495,478 A * 2/1996 Wilkinson et al. .......... 370/399
5,655,113 A * 8/1997 Leung et al. ................ 713/401
5,918,074 A * 6/1999 Wright et al. ................. 710/52
6,687,247 B1 * 2/2004 Wilford et al. ............. 370/392

\* cited by examiner

*Primary Examiner*—Hanh Nguyen
(74) *Attorney, Agent, or Firm*—Schmeiser, Olsen & Watts; William H. Steinberg

(57) ABSTRACT

A multi-module switching system comprising at least two switching modules adapted for receiving data packets from at least one input adapter and transmitting the data packets to at least one output adapter, each of the switching modules including a shared buffer for buffering a portion of a data packet received from an input adapter and transmitting the portion to an output adapter. One of the switching modules is a master module receiving a portion of a data packet containing a packet header and sending control information contained therein serially to each other switching module as a slave module. Each slave module includes a delay computing structure adapted for computing a delay needed to transmit the control information from the master module to this slave module and a first storing structure adapted for storing a portion of a data packet transmitted from an input adapter to the slave module during the delay, before transmitting the portion to a respective shared buffer such that the portion of data packet is not received by the shared buffer before the slave module has received the control information from the master module.

12 Claims, 5 Drawing Sheets

MULTI-MODULE SWITCHING SYSTEM

FIELD OF THE INVENTION

The present invention relates to telecommunications within a data transmission network and more particularly a multi-module switching system for achieving routing of packets from an input port to an output port of a router.

BACKGROUND OF THE INVENTION

The need for higher speed systems is increasing, particularly with the development of more sophisticated networks, multimedia applications and high speed communications. The needs are such that today, switches accepting speeds of 100 gigabits will be more and more in demand. However, a problem arises from the fact that the speed of a switch is strongly dependent on the actual technology that is used.

Therefore, for a given state of technology, it would appear difficult to achieve enhancement of switches that are known. There is therefore a need in the art for aggregating basic switching modules in such a manner that preserves the internal capabilities and efficiency of the module. Particularly, it is preferable that the aggregated switching structure does not require input or output ports, thus decreasing the number of ports that remain for a user. Additionally, it is preferable that the aggregate switching structure remains in a single stage.

Another problem arises from the circumstances that a user's premises are often equipped with line attachments that are fixed and determined for a relatively long period of time, as investments made in telecommunications equipment are often substantial. Therefore, although there is a strong need for higher speed switching systems, there is a desire for utilizing investments that have already been made, and thus for permitting a wide range of attachments.

As is known, speed expansion from input lines having a speed of 2 gigabits/second to input lines having a speed of 4 gigabits/second may be achieved by combining two switching modules. When received by an adapter, a packet may be split into two portions. A first portion containing a packet header with control information therein, for example routing or priority information, is sent to a master module while, at the same time, a second portion containing data is sent to a slave module. When the master module receives the packet header, validity of the packet is verified. If the packet is valid, the master module sends the control information to the slave module using a speed expansion bus. The slave module receives the control information within a packet cycle which, in one example, is 128 nanoseconds (hereinafter referred to as "ns") with packets of 64 bytes. Subsequently, the portion of the packet respectively received in the master and slave switching modules is stored in a shared buffer.

Similarly, when control logic associated with a switch sends a packet to an output adapter, the master module reads the shared buffer and a packet address is sent from the master module to the slave module using the speed expansion bus. The packet address is received within a packet cycle by the slave module which then reads the shared buffer and both master and slave modules start to send respective portions of the packet at substantially the same time within the packet cycle.

Therefore, as is described hereinabove, it is possible to use two switching modules in association with a data transmission line, the speed of which has doubled, insofar as it is possible for the master module to send control information within a packet cycle. However, assuming that data speed expansion is such that a plurality of switching modules, for example eight (8) modules, are needed to accommodate a given data speed, it would no longer be possible to send the control information to all switching modules linked in series before data are received by each module.

Moreover, it would not be possible at relatively higher speeds to use a multi-drop configuration wherein the master module drives a single bus, or to implement a bus inside the master module because of the resulting large number of input/output ports in the module.

It is believed, therefore, that a multi-module switching system which provides the many advantages taught herein would obviate many of the problems and limitations described hereinabove, and would constitute a significant advancement in the art.

OBJECTS AND SUMMARY OF THE INVENTION

It is a primary object of the present invention to provide a multi-module switching system wherein data from an input adapter are received in slave switching modules at substantially the same time as control information is received through a speed expansion bus.

In accordance with one embodiment of the invention, these is provided a multi-module switching system comprising at least two switching modules adapted for receiving data packets from at least one input adapter and transmitting the data packets to at least one output adapter, each of the switching modules comprising a shared buffer adapted for buffering a portion of a data packet received from one of the input adapters and transmitting the portion of data packet to one of the output adapters, one of the switching modules being a master module adapted for receiving a portion of data packet containing a packet header and sending control information contained therein serially to each other switching module as a slave module, each slave module comprising a delay computing structure adapted for computing a first delay needed to transmit the control information from the master module to the slave module and a first storing structure adapted for storing the portion of data packet transmitted from the input adapter to the slave module during the first delay before transmitting the portion to the shared buffer such that the portion of data packet is not received by the shared buffer before the slave module has received the control information from the master module.

BRIEF DESCRIPTION OF THE DRAWINGS

The above and other objects, features and advantages of the present invention will be better understood by reading the following more particular description of the invention in conjunction with the accompanying drawings wherein.

DETAILED DESCRIPTION OF THE INVENTION

Figure 1:
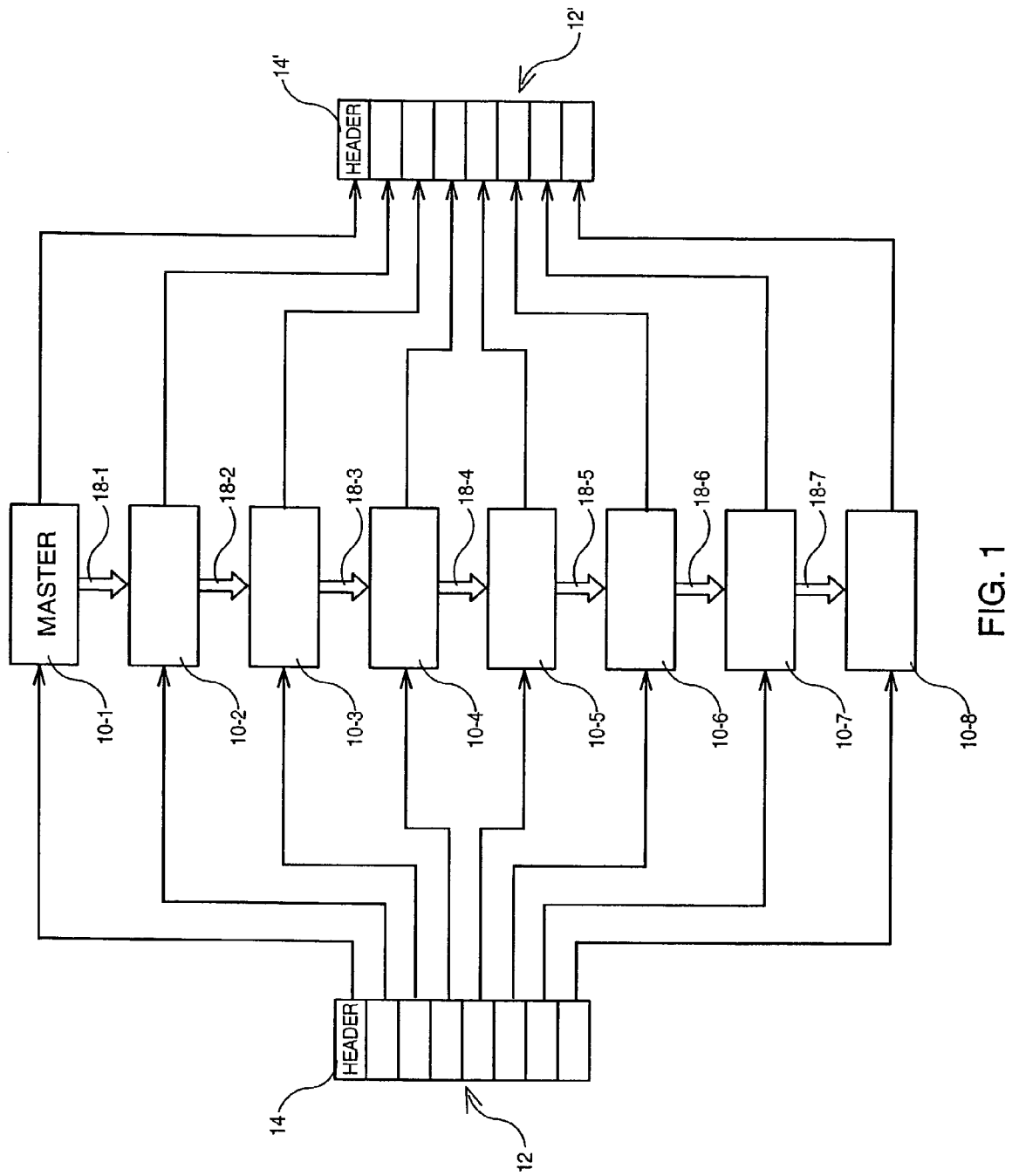
FIG. 1 is a schematic diagram showing transmission of a data packet from an input adapter to an output adapter of a switching device wherein the device comprises eight switching modules according to one embodiment of the invention.

Assuming that data packets are received in a port of an input adapter (not shown) from a link working at about 16 gigabits/second and that switching modules operate at a speed of about 2 gigabits/second, 8 switching modules 10-1 to 10-8 would be utilized as shown in FIG. 1. Data packet 12 received in an input adapter is divided into 8 portions of substantially the same size, with first portion 14 containing a packet header. The 8 portions of data packet 12 are transmitted respectively to switching modules 10-1 to 10-8 using a set of 8 physical connections, each connection operating at a speed of about 2 gigabits/second. First portion 14 containing a packet header is transmitted to first switching module 10-1, also known as a master module, whereas the 7 other portions containing data payload are transmitted to switching modules 10-2 to 10-8, also known as slave modules.

When master module 10-1 receives the packet header, control information contained therein is transmitted using speed expansion bus 18-1 to slave module 10-2, which transmits the information to slave module 10-3 using speed expansion bus 18-2, and so on, until slave module 10-7 transmits the information to slave module 10-8 using speed expansion bus 18-7 such that all slave modules receive control information containing a memory address at which data packet 12 is to be stored. In one example, speed expansion bus 18 (shown in FIG. 3) comprises speed expansion bus 18-1 to 18-7.

Similarly, when master module 10-1 retrieves data packet 12 from memory (not shown), control information is sent to slave modules 10-2 to 10-8. When a slave module receives control information from master module 10-1, the control information contains a memory address from which packet 12 is to be retrieved. The 8 portions are transmitted to an output adapter (not shown) using a set of 8 physical connections, and data packet 12' with header 14' may be re-assembled.

Figure 2:
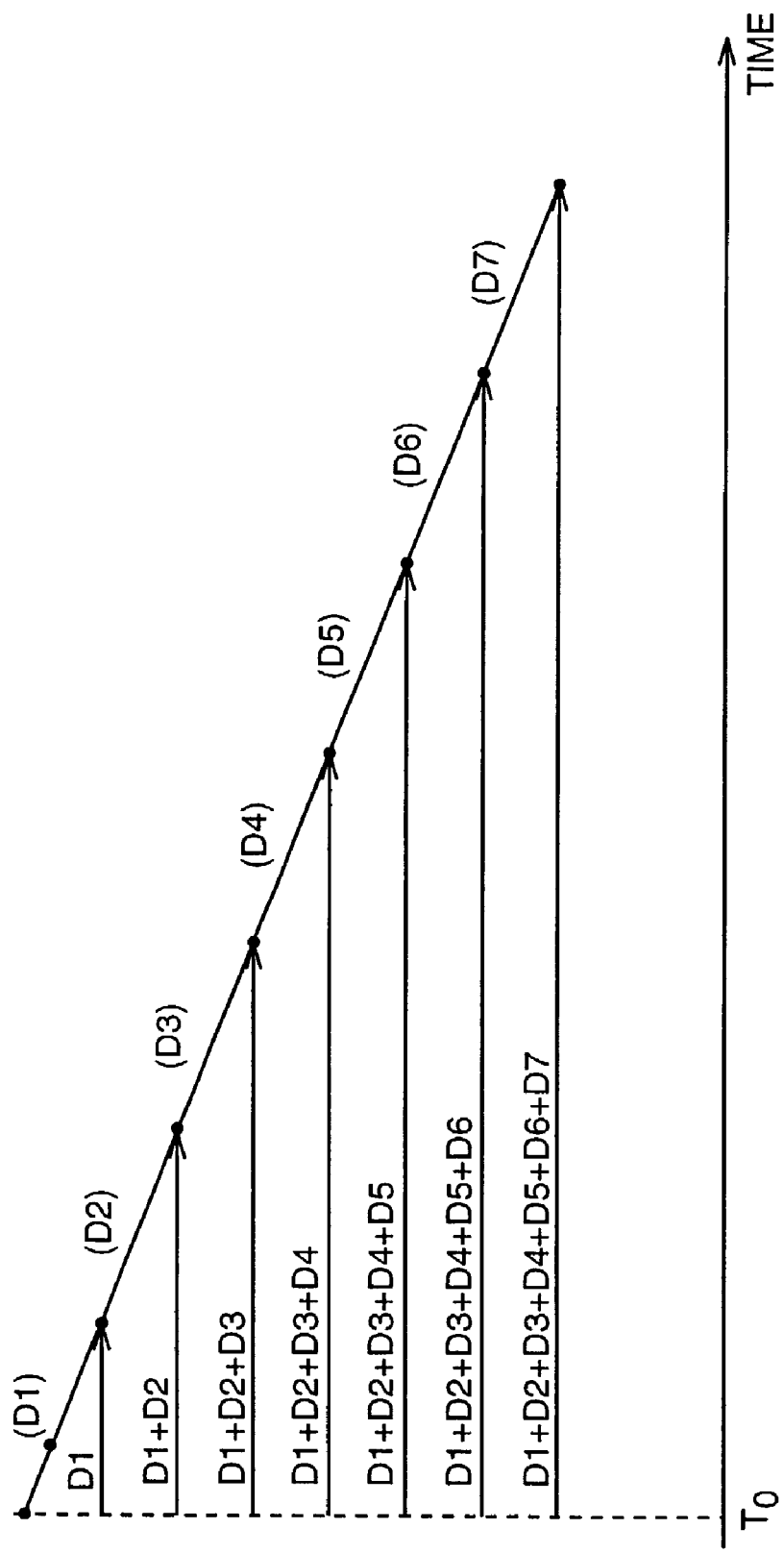
FIG. 2 is a diagram showing delays to be introduced for switching modules in an ingress path according to one embodiment of the invention.

However, as described hereinabove, there is a delay during propagation of control information through a speed expansion bus from a switching module to a following switching module. As shown in FIG. 2, a delay from master module 10-1 to slave module 10-2 is also known as D1, a delay from slave module 10-2 to slave module 10-3 is also known as D2 and so on, with a delay to propagate information from slave module 10-7 to slave module 10-8 also being known as D7. Therefore, a first delay may be introduced in a data path of a slave module to prevent a portion of data packet sent by an input adapter to a slave module from being received before control information is received thereby. If control information is not received first, a portion of data packet sent by an input adapter is discarded as this portion does not correspond to a destination address. Furthermore, a delay or data latency to be introduced starting at a time known as To is substantially the same delay as that taken for control information to reach a given slave module. In one example, To is a time at which master module 10-1 receives a packet portion containing control information for transmitting data payload to a corresponding slave module in an ingress path. For example, D1 is introduced for slave module 10-2, D1+D2 for slave module 10-3 and so on, with D1+D2+D3+D4+D5+D6+D7 introduced for slave module 10-8. Also, data is transmitted to and from switching modules substantially contemporaneously with a time pulse delimiting a cycle corresponding to a portion of data packet being transmitted. For example, assuming that a packet comprises 64 bytes received at a speed of 16 gigabits/second, a packet portion cycle corresponding to transmission time of a data packet portion is about 32 ns in duration. Given a clock cycle of 8 ns, this packet portion cycle corresponds to 4 clock cycles.

Therefore, by way of example, delays D1, D2 . . . . D8 may be converted to a data latency as shown in Table 1 hereinbelow:

TABLE 1

| Speed Expansion Bus Delay | Data Latency |
| --- | --- |
| 0 to 32 ns | 1 packet portion cycle |
| 33 to 64 ns | 2 packet portion cycles |
| 65 to 96 ns | 3 packet portion cycles |
| 97 to 128 ns | 4 packet portion cycles |
| 129 to 160 ns | 5 packet portion cycles |
| 161 to 192 ns | 6 packet portion cycles |
| >192 ns | Error: speed expansion bus too slow |

Figure 3:
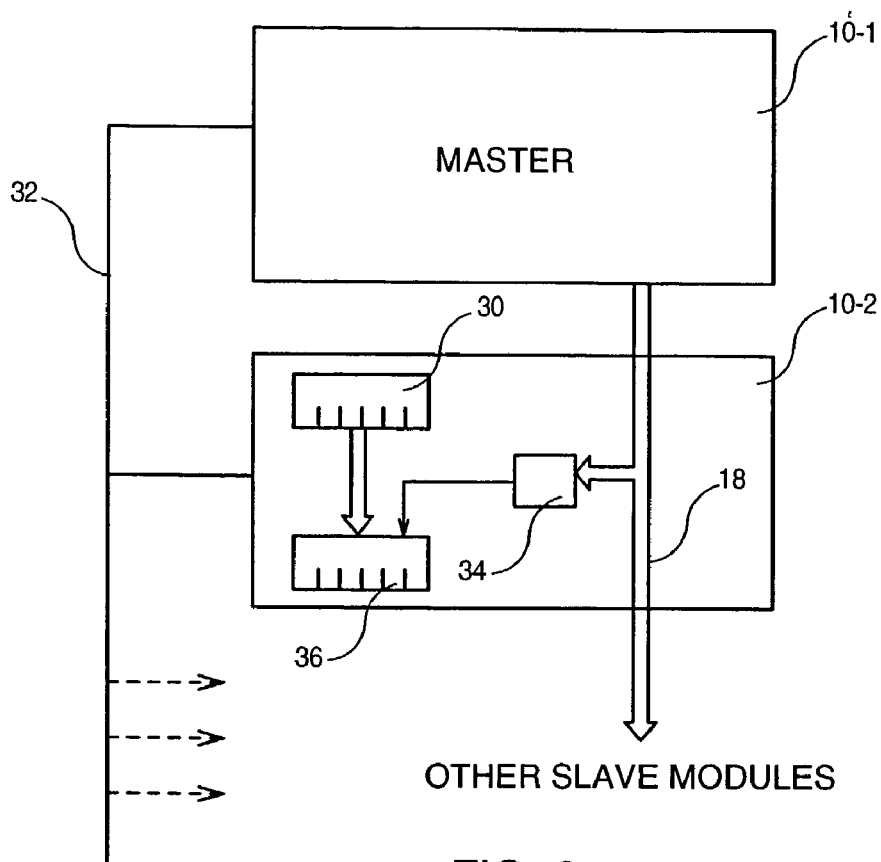
FIG. 3 is a schematic diagram showing a delay computing structure used in a slave module to compute a delay for control information to reach the module according to one embodiment of the invention.

The delay through a speed expansion bus may be computed for a given slave module. As shown in FIG. 3, a slave module, in one example slave module 10-2, includes counter 30 which is incremented by clock pulses. At initialization time, master module 10-1 sends a synchro pulse to counter 30 of slave module 10-2, and to respective counters (not shown) of slave modules 10-3 to 10-8 (shown in FIG. 1) using synchro line 32 for resetting these counters to zero. Thereafter, a synchro bit is transmitted through speed expansion bus 18. When a synchro bit is detected by synchro bit detector 34, contents of counter 30 are loaded in delay register 36. These components 30, 34 and 36 thus serve as a delay computing structure. Therefore, after propagation of a synchro bit through speed expansion bus 18, respective delay registers of slave modules 10-2 to 10-8 (shown in FIG. 1) contain a delay to be used for these slave modules.

Figure 4:
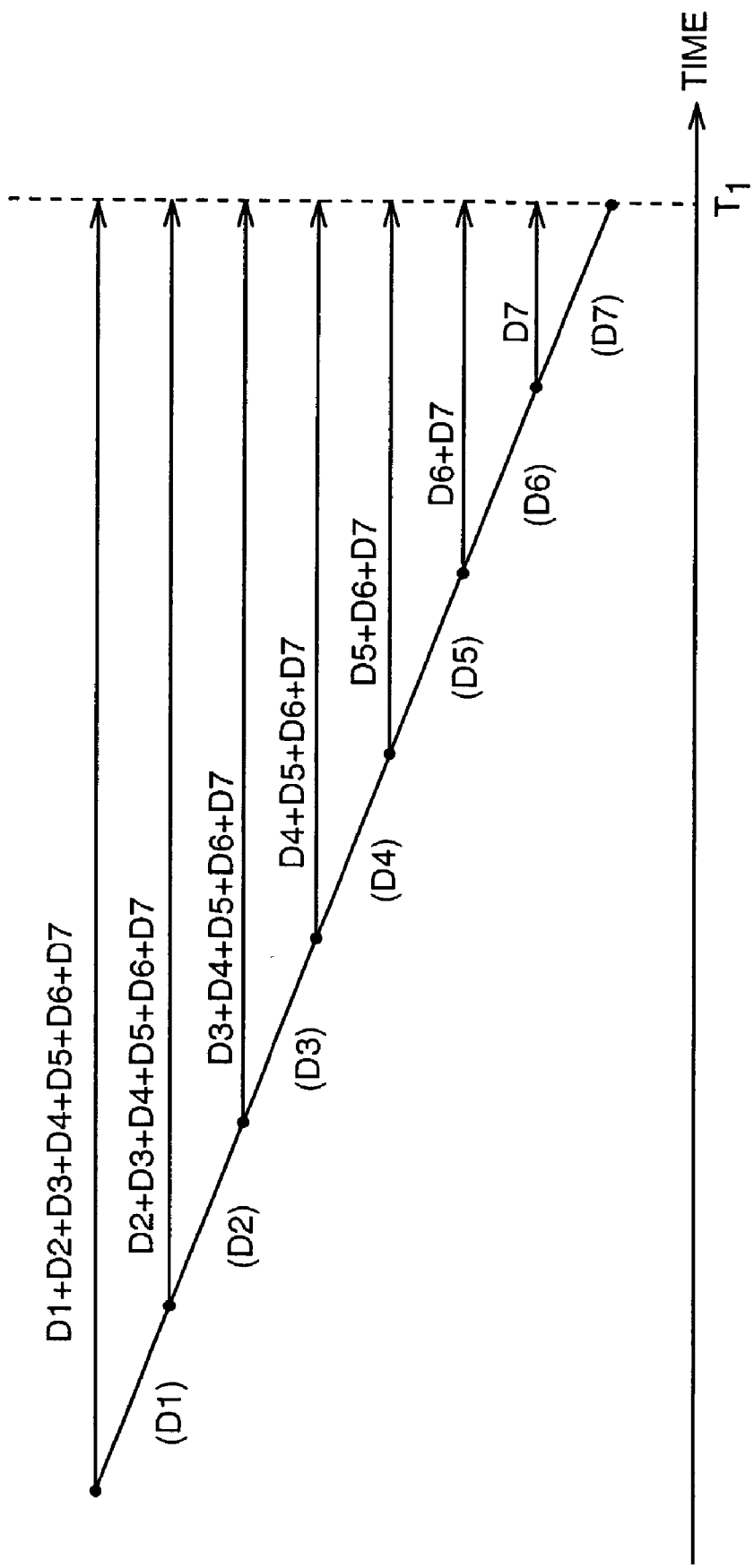
FIG. 4 is a diagram showing delays to be introduced for switching modules in an egress path according to one embodiment of the invention.

In an egress path, a second delay may be introduced in a data path of master module 10-1 and slave modules 10-2 to 10-7 to allow these switching modules to send respective packet portions to an output adapter at substantially the same time, such that the packet portions reach the adapter at substantially the same time. A delay would not need to be introduced in a data path of slave module 10-8, as this module is at the end of speed expansion bus 18. As shown in FIG. 4, a delay introduced by master module 10-1, also known as a maximum delay, is substantially the same as a delay to transmit control information from master module 10-1 to slave module 10-8 at the end of speed expansion bus 18, i.e. D1+D2+D3+D4+D5+D6+D7 (10-1 to 10-8 are shown in FIG. 1, 18 is shown in FIG. 3). A delay introduced by slave module 10-2 is substantially the same as a delay introduced by master module 10-1 minus delay D1 and so on, with a delay introduced by an nth slave module being a delay for an n−1th slave module minus Dn. However, there is no delay introduced by slave module 10-8 at the end of speed expansion bus 18. Therefore, with delays computed as described hereinabove, switching modules may transmit respective packet portions to an output adapter at substantially the same time, $T_1$. Thus, the second delay is substantially equal to the maximum delay minus the first delay, i.e. a delay in which control information may be transmitted from master module 10-1 to a given slave module. It should also be noted that computed delays may be converted into data latencies as shown, for example, in Table 1 hereinabove.

Figure 5:
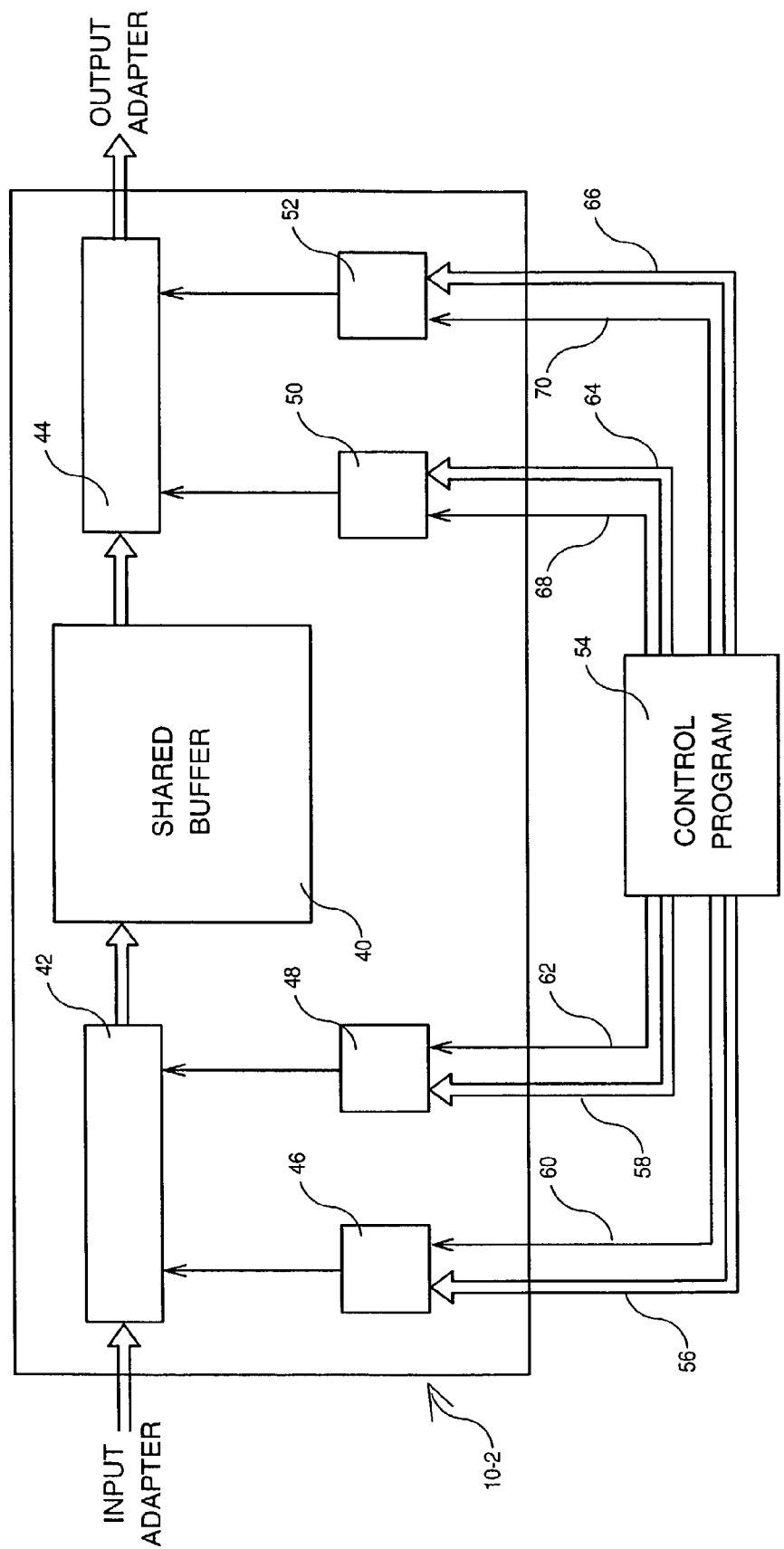
FIG. 5 is a schematic diagram showing a delay computing structure used in a slave module to introduce a programmed delay in ingress and egress paths according to one embodiment of the invention.

A mechanism for transferring data packets for a given switching module, in one example slave module 10-2, is shown in FIG. 5. Slave module 10-2 comprises shared buffer 40, input FIFO queue 42 and output FIFO queue 44. FIFO queue 42 buffers packet portions received from an input adapter, whereas FIFO queue 44 buffers packet portions to be transmitted to an output adapter. In FIFO queue 42, data are written at a FIFO queue address defined by first write pointer 46, and read at a FIFO queue address defined by first read pointer 48. In FIFO queue 44, data are written at a FIFO queue address defined by second write pointer 50 and read at a FIFO queue address defined by second read pointer 52.

At initialization time, write pointer 46 is initialized by control program 54 using bus 56 with a delay value that has been loaded in delay register 36 (shown in FIG. 3), whereas read pointer 48 is set to zero (0) using bus 58. Thereafter, pointers 46 and 48, controlled respectively by control program 54 using control lines 60 and 62, are incremented such that data written into input FIFO queue 42 are transferred into shared buffer 40 with a delay substantially equal to a delay value contained in delay register 36. In one example, the delay value is Dl for slave module 10-2. Input FIFO queue 42 thus serves as a first storing structure in which a time interval between an operation of writing a portion of data packet controlled by first write pointer 46, and an operation of reading a portion of data packet controlled by first read pointer 48 is substantially equal to the first delay, in one example D1.

Similarly, at initialization time, write pointer 50 is initialized by control program 54 using bus 64 with a delay that has been determined for a given switching module as shown in FIG. 4, whereas read pointer 52 is set to zero (0) using bus 66. Thereafter, pointers 50 and 52, controlled respectively by control lines 68 and 70, are incremented such that data written into output FIFO queue 44 are transferred to an output adapter with a delay substantially equal to a delay for a given module. Thus, in one example, the delay value is D2+D3+D4+D5+D6+D7 for slave module 10-2. Output FIFO queue 44 thus serves as a second storing structure in which a time interval between an operation of writing a portion of data packet controlled by second write pointer 50, and an operation of reading a portion of data packet controlled by second read pointer 52 is substantially equal to the second delay, in one example D2+D3+D4+D5+D6+D7.

It should be noted, however, that in order to provide a reduction in packet transit time through a switching module, packet portions may be processed in such a manner that only latency introduced in an egress path has an impact on packet transit time in a module. Consequently, data may be read from a shared buffer in master module 10-1 before a slave module at the end of speed expansion bus 18, in one example slave module 10-8, has written data into a respective shared buffer (10-1 and 10-8 are shown in FIG. 1, 18 is shown in FIG. 3).

Figure 6:
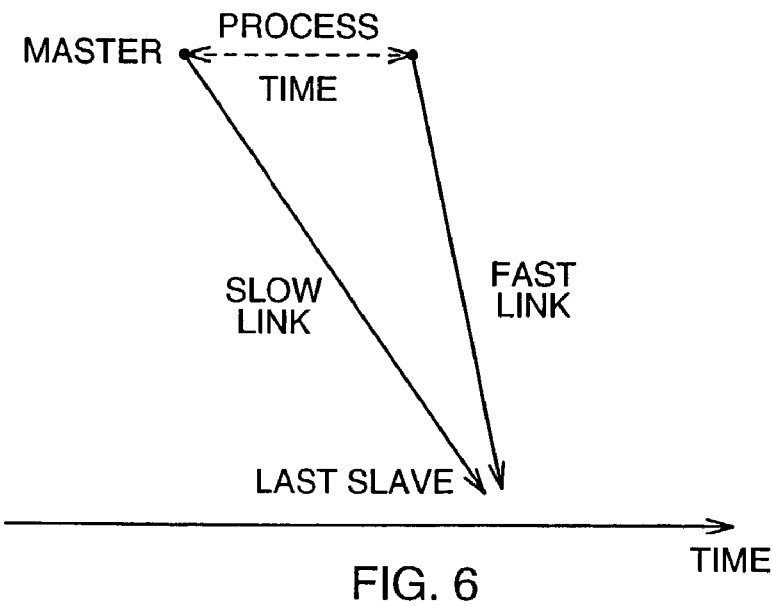
FIG. 6 is a diagram showing that processing time of a master module should be greater than a timing skew which may occur between links on a speed expansion bus.

Due to the nature of physical links used in speed expansion bus 18, a timing skew may be introduced between links used for ingress and egress paths. However, a given module should not transmit data from a respective shared buffer before associated data have been written in a respective shared buffer of another module, in one example slave module 10-8, at the end of speed expansion bus 18. As shown in FIG. 6, processing time of a master module, in one example master module 10-1, should be greater than a timing skew that may occur between links of speed expansion bus 18.

While there have been shown and described what are at present the preferred embodiments of the invention, it will be obvious to those skilled in the art that various changes and modifications may be made therein without departing from the scope of the invention as defined by the appended claims.

What is claimed is:

1. A multi-module switching system comprising:
at least two switching modules for receiving data packets from at least one input adapter and transmitting said data packets to at least one output adapter, each of said switching modules comprising a shared buffer for buffering a portion of a data packet received from said at least one input adapter and transmitting said portion of data packet to said at least one output adapter, one of said switching modules being a master module for receiving a portion of a data packet containing a packet header and sending control information contained therein serially to each other switching module as a slave module, each slave module comprising a delay computing structure for computing a first delay needed to transmit said control information from said master module to said slave module and a first storing structure for storing said portion of data packet transmitted from said at least one input adapter to said slave module during said first delay before transmitting said portion of data packet to said shared buffer such that said portion of data packet is not received by said shared buffer before said slave module has received said control information from said master module.

2. The multi-module switching system according to claim 1, wherein said first delay computed by said delay computing structure is converted into a data latency comprising a number of packet portion cycles corresponding to a time equal to or greater than said first delay.

3. The multi-module switching system according to claim 2, wherein said data packets are received by said at least one input adapter or transmitted from said at least one output adapter at a speed of about 16 gigabits/second and there are 8 switching modules operating at a speed of about 2 gigabits/second.

4. The multi-module switching system according to claim 1, further including a speed expansion bus adapted for transmitting said control information serially from said master module to said slave module.

5. The multi-module switching system according to claim 4, wherein said delay computing structure comprises a counter resettable to zero by said master module at an initialization time and which is incremented until said structure receives a synchro bit transmitted from said master module through said speed expansion bus.

6. The multi-module switching system according to claim 5, wherein said first storing structure is a FIFO queue in which a time interval between an operation of writing said portion of data packet and an operation of reading said portion of data packet is substantially equal to said first delay.

7. The multi-module switching system according to claim 5, further comprising a first write pointer and a first read pointer, said first write pointer loaded at said initialization time with a value substantially equal to said first delay and adapted for controlling an operation of writing said portion of data packet into said first storing structure, said first read pointer set to zero at said initialization time and adapted for controlling an operation of reading said portion of data packet.

8. The multi-module switching system according to claim 7, wherein said slave module further comprises a second storing structure adapted for storing a portion of a data packet transmitted from said shared buffer to said output adapter during a second delay which is substantially equal to a maximum delay minus said first delay such that respective portions of data packet transmitted by said master module and each said slave module reach said output adapter at substantially the same time.

9. The multi-module switching system according to claim 8, wherein said maximum delay is a delay taken for said control information to be transmitted from said master module to a slave module at the end of said speed expansion bus.

10. The multi-module switching system according to claim 9, wherein said second storing structure is a FIFO queue in which a time interval between an operation of writing said portion of said data packet and an operation of reading said portion of said data packet is substantially equal to said second delay.

11. The multi-module switching system according to claim 9, further comprising a second write pointer and a second read pointer, said second write pointer loaded at said initialization time with a value substantially equal to said second delay and adapted for controlling an operation of writing said portion of said data packet into said second storing structure, said second read pointer set to zero at said initialization time and adapted for controlling an operation of reading said portion of said data packet.

12. The multi-module switching system according to claim 11, wherein processing time of a portion of said data packet by said master module is greater than a timing skew occurring between links in said speed expansion bus such that transmission of said portion of said data packet by said master module does not occur before said portion of said data packet has been stored in said shared buffer of said slave module at the end of said speed expansion bus.

* * * * *